Sept. 9, 1924.
R. H. BOWEN
SHAFT HANGER
Filed Sept. 1, 1921
1,508,007
6 Sheets-Sheet 1
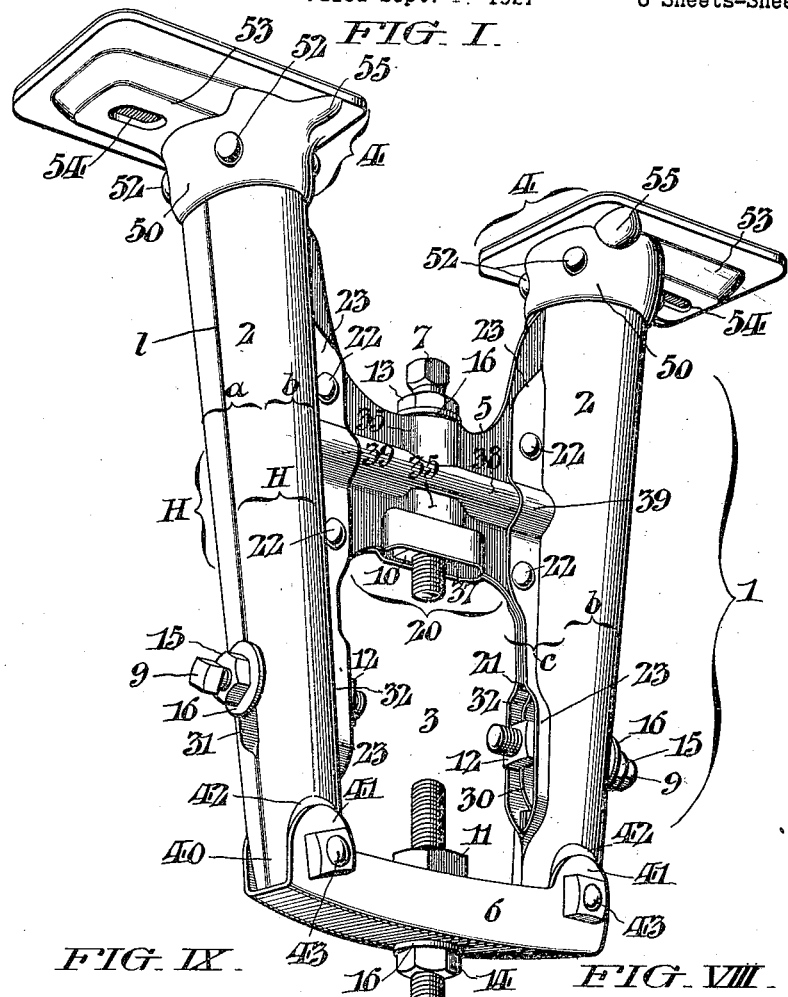
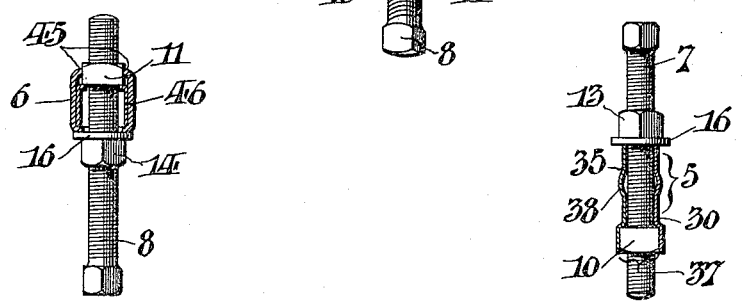
WITNESSES:
INVENTOR:
Russell H. Bowen,
BY
ATTORNEYS.

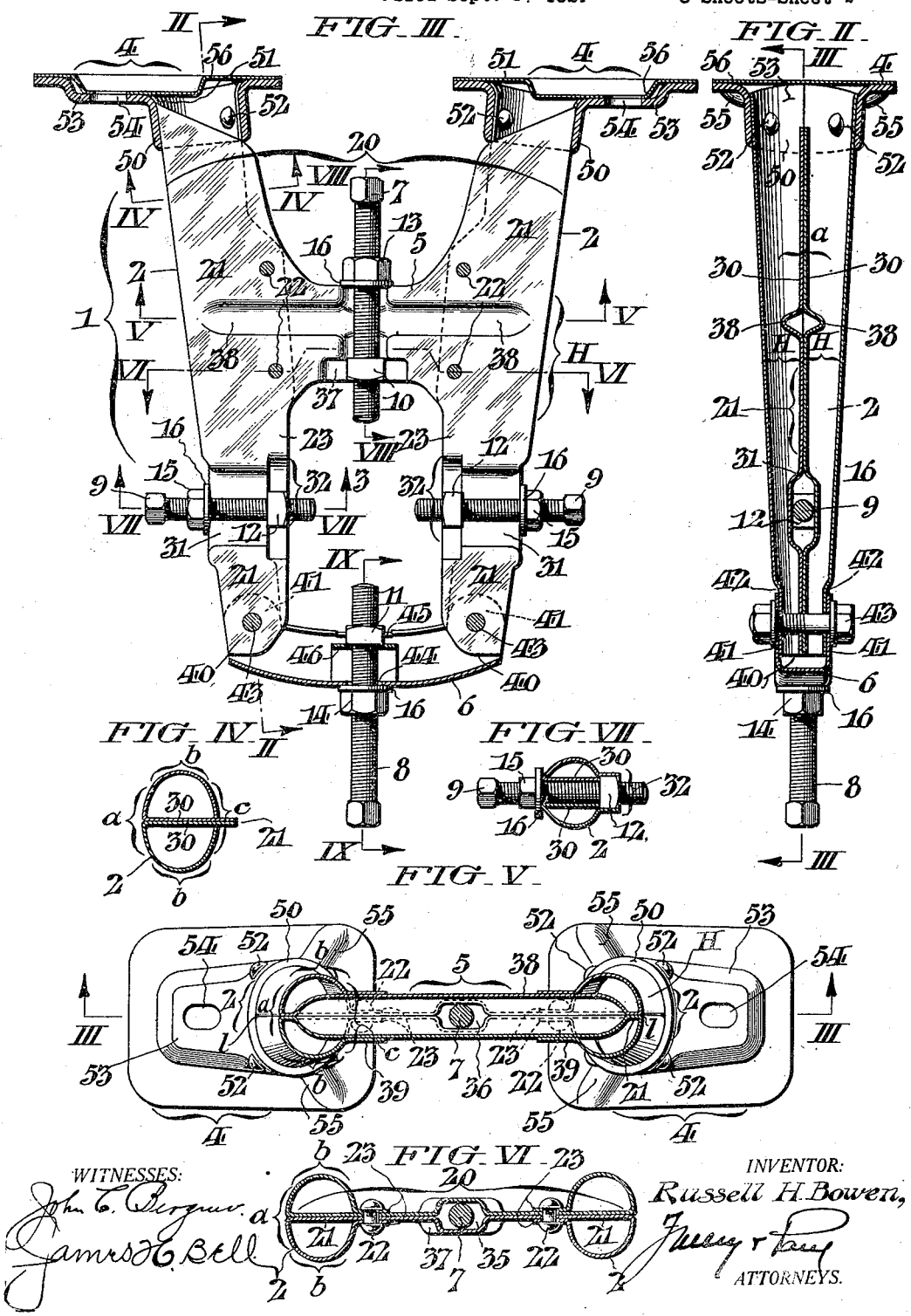

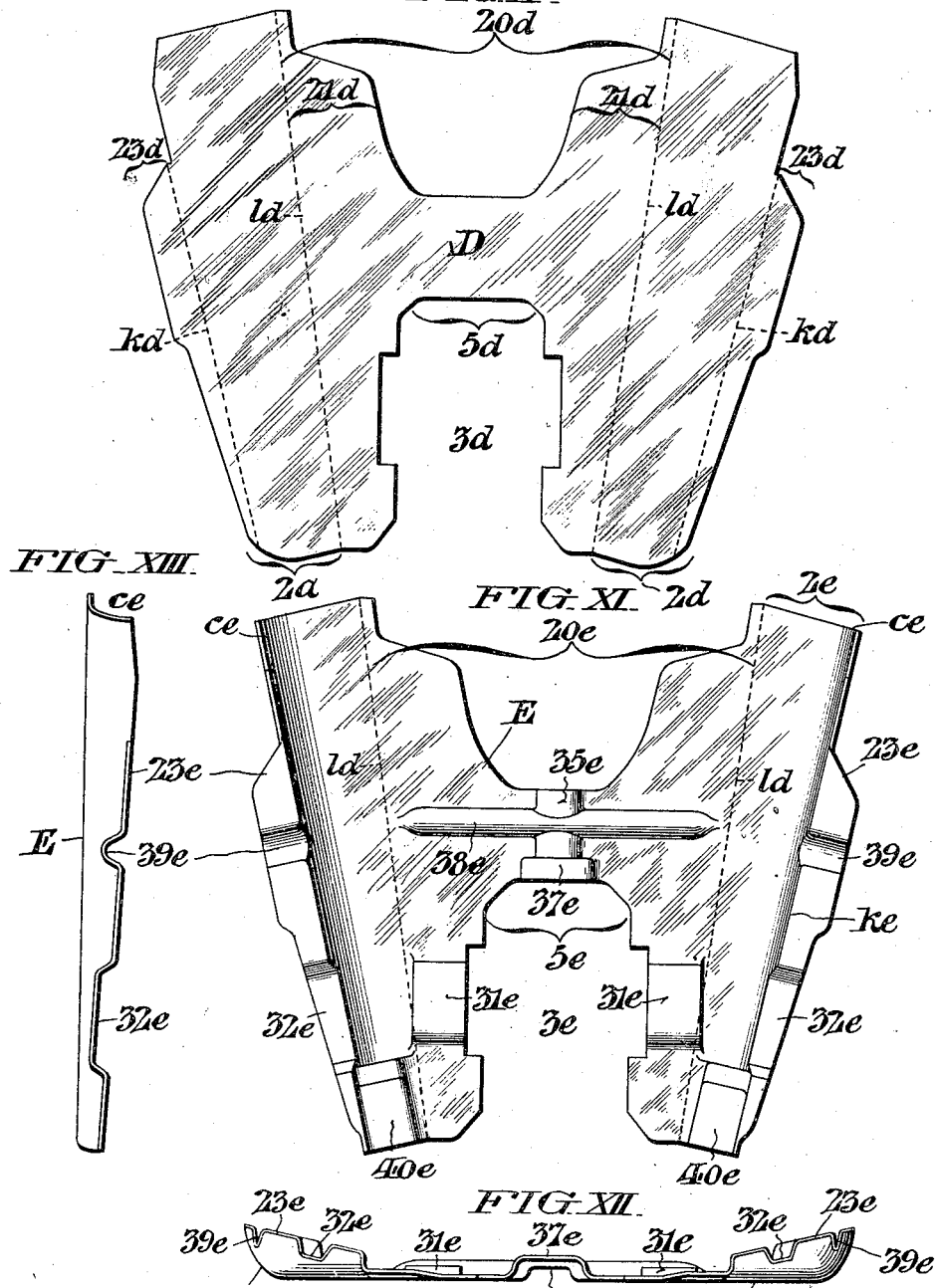

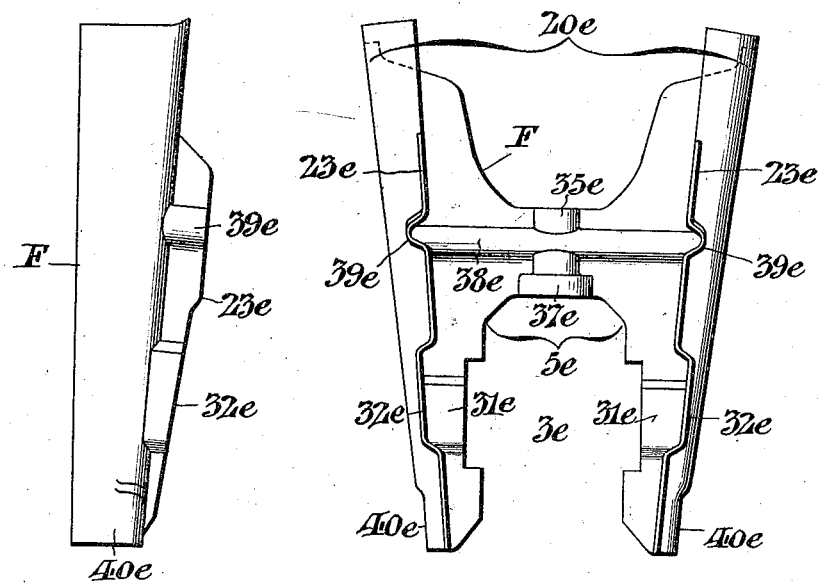
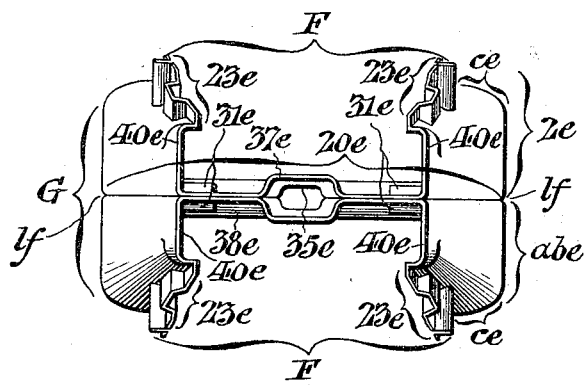

Sept. 9, 1924.  
R. H. BOWEN  
SHAFT HANGER  
Filed Sept. 1, 1921  
1,508,007  
6 Sheets-Sheet 5
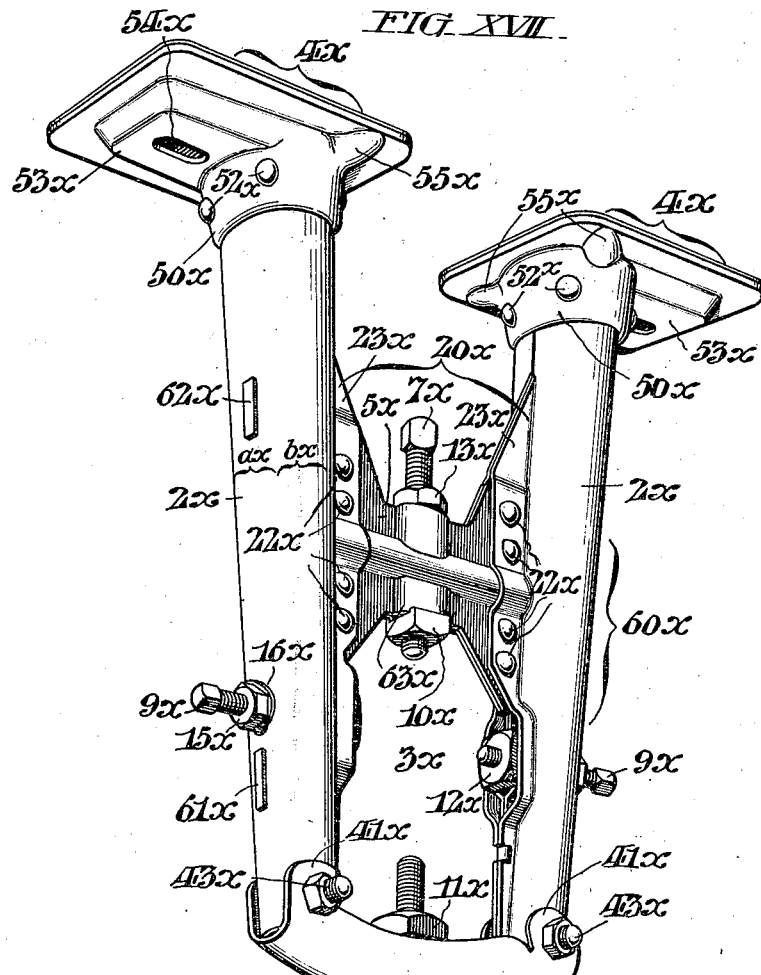
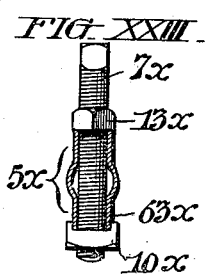
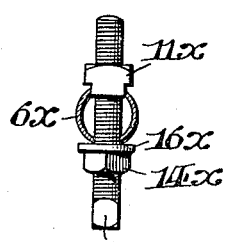
WITNESSES:  
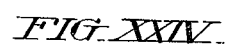
INVENTOR:  
Russell H. Bowen,  
BY  
ATTORNEYS.

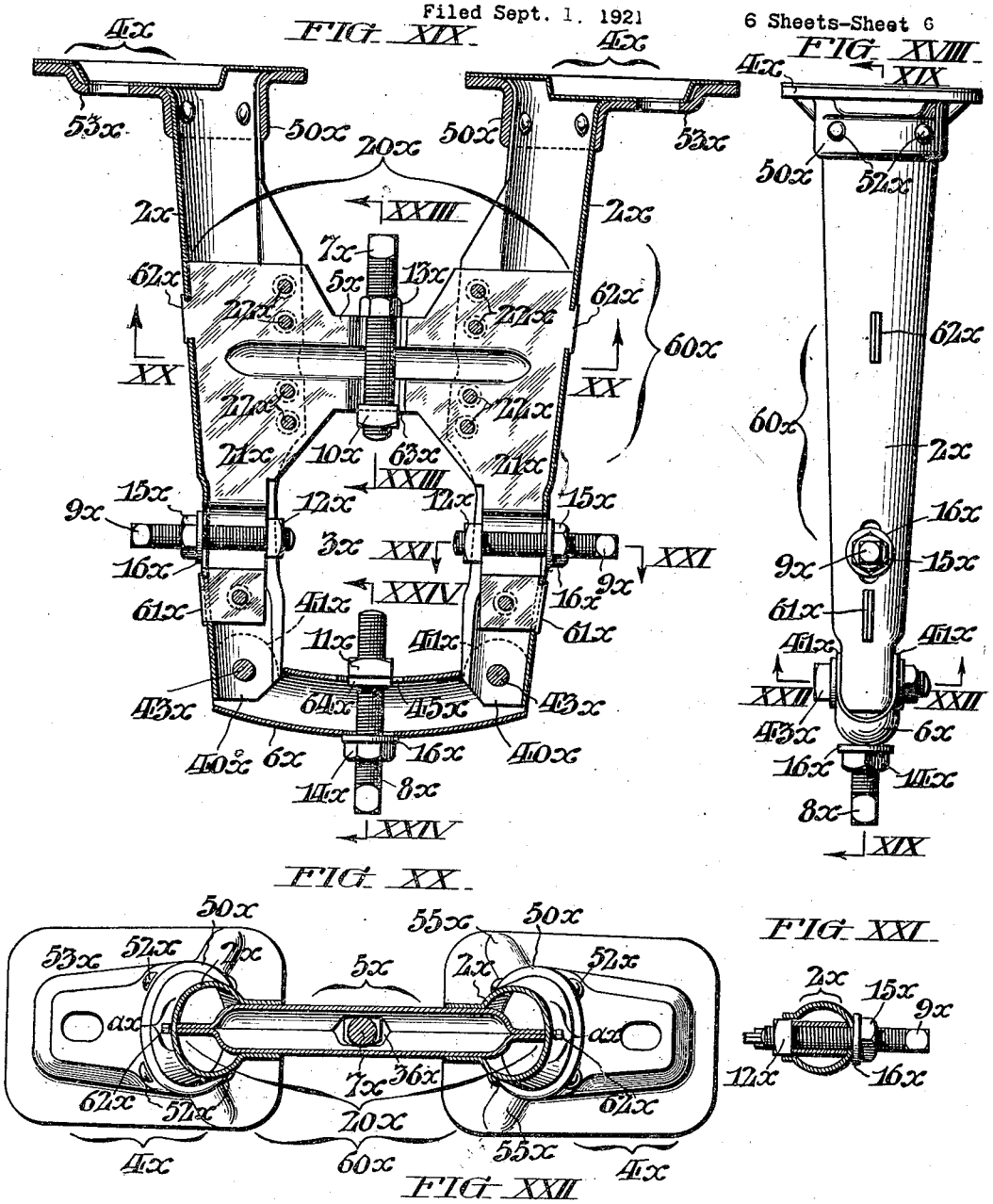

Patented Sept. 9, 1924.

1,508,007

UNITED STATES PATENT OFFICE.

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

SHAFT HANGER.

Application filed September 1, 1921. Serial No. 497,781.

*To all whom it may concern:*

Be it known that I, RUSSELL H. BOWEN, a citizen of the United States, residing in Philadelphia, in the county of Philadelphia and State of Pennsylvania, have invented certain new and useful Improvements in Shaft Hangers, whereof the following is a specification, reference being had to the accompanying drawings.

My invention relates to shaft hangers and the like, and is especially concerned with shaft hangers of sheet metal type. Though my invention is to some extent applicable to other hangers, my principal aim, nevertheless, is to secure advantages that are greatly enhanced by sheet metal construction,—such as combined strength, rigidity and lightness; facility, simplicity, quickness, and economy in manufacture; and a generally neat and pleasing appearance. Other advantages that can be secured through my invention include excellent adaptation in strength of the various parts of the hanger to the stresses to which they are subjected in service; stiffness of the hanger, and exemption from working or loosening of its parts in service; and an almost entire freedom from crevices or openings liable to catch and accumulate lint, dirt, oil or grease that would add to the fire hazard in case of a "hot box" at a shaft bearing.

How these and still other advantages may be realized through my invention will appear from my description hereinafter of the best embodiments known to me.

In the drawings, Fig. I is a perspective view of a preferred form of hanger constructed in accordance with my invention.

Fig. II shows a longitudinal section through one of the legs of the hanger shown in Fig. I, taken as indicated by the line II—II in Fig. III.

Fig. III shows a vertical longitudinal section through the hanger at right angles to Fig. II, taken as indicated by the line III—III in Figs. II and V.

Figs. IV, V, VI and VII are in the main transverse sectional views, taken as indicated by the correspondingly numbered section lines in Fig. III, illustrating the configuration and construction of the hanger legs and of the cross-brace.

Figs. VIII and IX are fragmentary cross sectional views, taken as indicated by the lines VIII—VIII and IX—IX in Fig. III, illustrating the mounting of some of the bearing-supports of the hanger.

Fig. X shows a flat sheet metal blank suitable for the manufacture of one of the main "body" pieces of the hanger shown in Figs. I to IX.

Fig. XI shows the same blank embossed in preparation for bending it to final form.

Figs. XII and XIII are edge views of the embossed blank shown in Fig. XI, from the bottom and from the left of that figure, respectively.

Fig. XIV shows the blank at an intermediate stage of bending, and Fig. XV is a corresponding edge view, from the left of Fig. XIV.

Fig. XVI is an edge view, from the bottom of Fig. XIV, showing two embossed and bent blanks such as shown in Fig. XIV superposed for welding together before completion of the bending operation.

Fig. XVII is a perspective view of another form of hanger conveniently embodying my invention.

Figs. XVIII to XXIII are views illustrating this second form of hanger that correspond in a general way to Figs. II to IX for the first form,—the sectional views being taken as indicated by correspondingly numbered section lines. Fig. XVIII, it should be noted, however, is a side or edge view of the hanger, from the left of Figs. XVII and XIX.

Fig. XXIV is a fragmentary sectional view, taken as indicated by the line XXIV—XXIV in Fig. XIX, illustrating the attachment of a bottom piece to the hanger leg.

The shaft hanger 1 illustrated in Figs. I to IX is of what may be termed the "straddling" type, comprising a pair of principal strength members 2, 2, with an opening 3, between them for the shaft and its bearing (not shown) that are to be supported. (See Figs. I–III.) The hanger 1 is shown in the upright position in which such shaft hangers are commonly used; and for the sake of convenience and brevity, I have hereinafter (as a rule) described it in terms especially applicable to that position. It will be understood, however, that the hanger may be used in other positions,—in reference to which, of course, some of the terms here employed might seem less appropriate.

As shown, the strength members 2, 2, on either side of the shaft (when in place) are hollow, and are in the form of downward tapering legs or standards with feet 4 at their upper ends for attaching the hanger to a floor or roof beam (not shown), or to any other supporting structure. Between the side legs 2, 2 is a cross-brace member 5 having the general form of a transverse vertical web; and also a bottom member or yoke 6, which is readily detachable from the lower ends of the legs to facilitate introduction of the shaft into the shaft opening 3. For supporting the shaft and its bearing in the opening 3 and maintaining proper alignment, the hanger is provided with upper and lower supports 7 and 8 extending vertically through the transverse members 5 and 6, as well as with lateral supports 9, 9, extending transversely through the legs 2, 2 at either side of the opening 3. These bearing-supports 7, 8, and 9, 9 have the usual form of set-screws, and are provided with adjusting nuts 10, 11 and 12, 12 mounted on or in the various members 5, 6 and 2, 2 as hereinafter described,—as well as with lock or clamping nuts 13, 14 and 15, 15 bearing against the outer sides of said members through interposed washers 16. As shown, the side legs 2, 2 are only approximately vertical, sloping outward and diverging somewhat from their lower ends toward their upper ends, so as to give the hanger an amply broad transverse "base" at the feet 4.

The legs 2, 2 are hollow, as already mentioned. For convenience and brevity, they may be regarded as "facing" toward the shaft (not shown) supported by the hanger, and various portions of their contours or walls (see Figs. I, III, IV to VII) may be correspondingly distinguished as "backs" *a*, "sides" *b*, and "bellies" *c*. (The use of the word "sides" or "flanks" in this "leg anatomy" to designate the leg surfaces to right and left in Fig. II must not be confused, of course, with the use of similar terms, e. g., "side legs" and "sidewise," to express the relation of parts at right and left of Figs. I, III, and V in reference to the hanger 1 as a whole and to the position of the shaft and bearing supported by it.) Preferably (though not necessarily), the legs 2, 2 are closed—or virtually so—at least from the hanger feet 4 to the lateral bearing-supports 9, 9, and even beyond said supports, between them and the bottom member 6. Preferably, also, the legs 2, 2 are formed of sheet metal pressed or bent to shape with edges in proximity or abutting along the bellies *c*. As shown, the legs 2, 2 are of round tubular form substantially from end to end. They are not truly circular, however, but more nearly elliptical, with the major axes of the ellipses extending from right to left in Fig. II, so as to give the legs and the hanger ample strength in that direction.

Referring, now, more especially to Figs. I, III, and IV to VII, it will be seen that the hanger comprises a web plate 20 that extends through the bellies *c* of the legs 2, 2, above the shaft opening 3, into their interiors. An intermediate portion of the plate 20, between the legs 2, 2, is of relatively narrow vertical width, and forms the web-like cross-brace 5, which interconnects the legs and serves to strengthen and stiffen the hanger as a whole sidewise (i. e., to right and left in Figs. I and III). Within and adjacent the legs 2, 2, the plate 20 "widens" vertically to form longitudinal internal webs or flanges 21, 21 in the legs that extend sufficiently above and below the transverse member 5 to reinforce and stiffen the legs (sidewise of the hanger, in their common plane) above and below said member, as well as at their junctions with it. They also brace the legs 2, 2 relative to the member 5, and reinforce and stiffen the hanger as a whole sidewise. In a downward direction, these webs or strength members 21, 21 extend substantially to (i. e., as far as) the lateral bearing supports 9, and even on past them to the lower ends of the legs. This they do in various ways, as will become apparent from further description.

Referring especially to Fig. III, it will be seen that the portions of the plate 20 (including its upward and downward extensions in the legs 2, 2) which constitute the webs 21, 21 extend clear to the backs *a* of the legs, and thus resist all inward forces tending to bend or flatten the legs, or to "rock" them (so to speak) about the ends of the cross-brace 5 or about the feet 4. As shown, moreover, each web or flange 21 is integrally connected or attached to its leg back *a* along the whole line of meeting,—practically the entire leg length from feet 4 to lateral bearing-support 9, and even to bottom member 6. This connection or attachment greatly fortifies the resistance of web and leg to inward forces such as mentioned above, since it makes the leg back *a* virtually a flange of a T-beam having the web 21 as its web. This same attachment also enables the web or flange 21 to reinforce the resistance of the leg 2 against outward forces tending to bend or rock it, and especially against the side thrust of the lateral bearing-support 9 of the leg in question: for, in the first place, this attachment makes the leg back *a* flange of a T-beam, as before; in the second place, the mere attachment of leg back to web beside the shaft opening 3 (especially at and adjacent the bearing-support 9) enables this portion of the leg to pull on the web and so add the bending resistance of the web to its own;

and in the third place, the attachment of leg back to web above the shaft opening 3 in addition to its just-mentioned attachment lower down makes the intermediate portions of leg and web virtually chords of a sort of "truss". The action in the lower portion of the leg 2 just described is, of course, virtually paralleled in its upper portion,—in so far, that is, as the upper portion is affected by outward forces.

Referring, now, especially, to Figs. III to VI, it will be observed that the inward projecting web or flange 21 in each leg 2 is here shown as of sufficient width or depth to be secured and connected or attached to the leg belly $c$ adjacent the brace 5, by means of rivets 22 extending through the web outside the leg 2 proper and through external longitudinal belly flanges 23 formed by outward extensions of the sheet metal of the two halves of the belly wall, one such flange at either side of the web. It will be readily appreciated that this belly attachment of the plate 20 coacts with its attachment to the leg back $a$ at any and every point to resist very effectually any force tending to rock the leg about the end of the cross-brace 5. Moreover,—disregarding the bottom member 6,—it will be seen that this belly attachment and the attachment of the leg back $a$ to the web 21 above the shaft opening 3 make the portions of the web and of the leg from above the shaft opening downward virtually cantilevers fixed at their upper ends. (The like is true, of course, mutatis mutandis, of the upper portions of leg and web.) As shown, the webs or flanges 21, 21 extend from back to belly in the legs 2, 2 throughout practically the whole length of the legs; and from the feet 4, 4 to about the lateral bearing-supports 9, 9, these webs are everywhere so wide as to extend outside the legs through their bellies. Also, the belly flanges 23, 23 are shown as extending (with gradually lessening width) downward from the cross-brace 5 to the yoke 6. This width of the webs 21, 21, gives them more ample strength, and the belly flanges 23, 23 themselves also strengthen and stiffen the legs. If desired, the attachment of webs to bellies by rivets 22 may be supplemented or made stronger by spot-welding or the like,—which may even be coextensive with the inner edges of the webs 21, 21, or at least with the overlap of webs and belly flanges. Extending from back to belly in the legs 2, 2 as they do, the webs 21, 21 reinforce and stiffen the legs against external crushing, and also against the collapse of back on belly (or vice-versa) involved in the bending of a tube. Thus the legs 2, 2 are reinforced and stiffened by the webs or flanges 21, 21 in many ways, especially at and above the sides of the shaft opening 3 and at the upper corners of said opening, where the bending stresses from the side thrust of the lateral bearing-supports 9, 9 on the legs are most severe. The effectiveness in this regard of the downward web extensions 21, 21 of the plate 20 from their connection or attachment to the cross-brace 5 and to the leg bellies $c$ above the shaft opening 3 well below the eased and rounded upper corners of this opening deserves especially to be noticed, since they sustain or resist the side thrust cantilever-wise independently (i. e., supplementarily) of the intermediate cantilever strength of the legs 2, 2. The importance of the structural continuity of the webs 21 (regardless of their integral material continuity) in reference to their reinforcing action in various ways will readily be apparent. Indeed, in virtue of their attachment to the transverse member 5, the webs 21, 21 function more or less independently as strength members for sustaining the lateral bearing supports 9, 9 and the bottom member 6.

Referring, now, more especially to Figs. I, III, and IV to VI, it will be observed that the plate 20 and its web portions 21, 21 are in the present instance arranged centrally with reference to the legs 2, 2, substantially in their common axial or median plane. As shown, also, the web plate 20 with its portions 21, 21 are laminated or multi-ply, being composed of a couple of superposed metal sheets 30, 30. In the portion of each leg 2 where its bearing-support 9 is located, the sheet metal 30 forming the web 21 is locally displaced laterally, by joggling, to accommodate the screw member 9. In this way, the plies 30, 30 are separated for a sufficient vertical distance to form a slot 31 of such length that the screw 9 may occupy any vertical position ever required for proper adjustment of bearing and shaft in the hanger opening 3,—there being, of course, a corresponding opening in the leg back $a$. In the leg belly $c$, however, there is a wider and correspondingly elongated opening 32 adapted to admit the support-adjusting nut 12 to seat against the inner or "belly" edges of the web or flange 21,—this opening 32 being formed by everting the belly walls $c$ (and especially their flange portions 23, 23) to either side sufficiently to admit the nut 12 between the everted portions. With this mounting, the nut 12 is not only concealed and effectually held against turning by the sides 23 of the opening 32, but is allowed to transmit the side thrust of the screw 9 directly to the downward web extension 21 of the plate 20. This thrust the web or flange 21 in turn transmits to the leg back $a$, and thus distributes to and shares with the leg walls. Also, the web or flange portions 30 at the opening prevent the leg 2 from being flattened or collapsed by clamping between the adjusting nut 12 and the lock nut 15.

Referring to Figs. I, III, V, and VIII, it will be seen that in the cross-brace 5, the sheet metal web or flange plies 30, 30 are locally separated at 35, in the way of outward embossing or joggling, to afford a somewhat elongated vertical opening or slot 36 for the accommodation of the upper bearing-support 7 between the plies, and that their lower edges are still further separated to provide a concealed anti-turning seat 37 for the adjusting nut 10. Also, it will be seen that the web 5 is itself reinforced and stiffened by opposite outward embossments of its plies, in the form of rounded or circular transverse corrugations 38. These corrugations 38 extend into the interiors of the legs 2, 2, and there terminate a little short of their backs $a$,—the belly flanges 23, 23 of each leg being appropriately recessed or corrugated at 39 to fit over and engage the corrugations 38.

Referring, now, to Figs. I, II, III, and IX, it will be observed that the bottom or yoke member 6 is of approximately rectangular cross section, is slightly bent or "bowed" downward, and is formed of a sheet metal piece bent to shape with its edges meeting along the center of its upper surface. At either end, the upper wall is omitted to afford an opening for the leg end 40, and the side walls are extended upward in the form of rounded and apertured ears or lugs 41, 41. The leg ends 40 are laterally flattened somewhat, as indicated at 42, and are apertured in correspondence with the ears 41 for the reception of bolts 43 that detachably secure the yoke 6 on the leg ends. These bolts 43 extend through the webs 21, 21 as well as through the leg sides $b$, $b$, and thus have ample bearing in the legs; also, the webs 21, 21 help to sustain the bottom member 6. The lower vertical bearing-support 8 extends through an elongated opening or slot 44 in the lower wall of the yoke 6, and its adjusting nut 11 is seated, and held against turning in a corresponding elongated opening 45 in the top wall, against the upper surface of an inverted sheet metal trough piece 46 secured inside the yoke, and apertured in correspondence with the slot 44.

Recurring, now, to the feet 4, it will be seen from Figs. I, II, III and V that they are of generally flat, rectangular form, but have outstanding tubular sockets 50 in which the legs 2 are received and expanded, as at 51, and also secured by some four rivets 52. The feet 4 are reinforced and stiffened with low, flat, hollow central bosses, 53, that extend outward from the sockets 50 toward the outer ends of the feet, and have in them elongated bolt holes 54; also, by short hollow, tapering ridges 55 that radiate diagonally (inward and sidewise) from the sockets 50 toward the inner corners of the feet. The upper ends of the legs 2 may be closed by thin cover plates 56 secured (as by spot-welding) over the "bottoms" (upper sides) of the feet 4; they are shown dished to fit into the bosses 53, and apertured in correspondence with the bolt holes 54. These cover plates 56 may conveniently be made by die pressing thin sheet metal; while the feet 4 themselves may be die pressed from heavier sheet metal, or may be drop-forged from suitable metal blanks.

From the foregoing description, it will be seen that the portions of the web plate 20 comprising the strength members 21, 21 and the cross-brace 5 in and of themselves constitute a structurally complete, rigid U frame for sustaining the bearing supports 7 and 9, 9. This U frame is supplemented and "closed" by the bottom member 6, which is attached to the lateral members 21, 21 of the U frame by the bolts 43, 43 in a manner independently of the legs 2, 2. The hollow legs 2, 2 formed by the embossed sheet metal leg halves at either side of the web plates 20 externally overlap the lateral frame members 21 throughout their length, and, indeed, effectually enclose them. The legs 2, 2 are secured to the upper corners of the complete rectangular bearing sustaining frame by the rivets 22, etc., and to the lower corners by the same bolts 43 that attach the bottom member 6 to the U portion of the complete frame, as already mentioned. In the construction of Figs. I–IX, of course, the lateral frame members 21, 21 are also secured to the legs 2, 2 throughout their length, by integral attachment along the leg backs $a$, and by welding at the belly flanges 23.

With exceptions for the most part pointed out hereinafter, the foregoing description of the hanger 1 of Figs. I to IX equally describes the form of hanger illustrated in Figs. XVII to XXIV; accordingly, similar reference characters have been applied to corresponding parts and features in the two sets of figures, as a means of dispensing with redescription of common features. Before taking up the other form of hanger, however, it is advisable to notice an important and distinctive structural feature of the hanger 1 not hitherto brought out, and to explain the very simple and economical method of manufacture which it makes possible.

It has already been stated that the legs 2, 2 of Figs. I to IX are preferably formed of sheet metal pressed or bent to shape, with edges in proximity or abutting along the bellies $c$, and that the two-ply web plate 20 is integrally attached to the hanger leg backs $a$. From this, it might, perhaps, be supposed that the legs 2, 2 would each be made of a single separate piece of sheet metal, and that the web plate 20 would be initially separate, but united and made integral with the leg backs *a* by welding or the like during manufacture.

While this supposable construction may answer as an embodiment of my invention in some cases (and somewhat resembles, indeed, my form of hanger illustrated in Figs. XVII to XXIV), such supposed construction differs very materially from that actually shown in Figs. I to IX.

Referring, once more, then, to Figs. I to IX, it will readily be seen that each leg 2 is in two originally separate half-round halves, each of which, as shown, is truly and ab initio integral with the adjacent ply or lamina 30 of the web plate 20,—though not so integral with the other leg half or with the other web ply. In other words, the main "body" piece of the hanger—comprising legs 2, 2 and cross-brace 5, but exclusive of feet 4 and bottom yoke 6—may be regarded as originally "split," along the median plane of legs 2, 2 and web plate 20, into two separate pieces H, each consisting of one web lamination and half of each leg. Such, in fact, is the mode of constructing the hanger that I prefer to employ in practice. Fig. III is virtually, then, a plan view of one of these counterpart pieces or halves H, flat side up; while in Fig. I, the line of juncture *l* of these halves H, H along the back of one of the legs 2 appears quite plainly.

Referring, now, to Figs. I to VIII and X to XVI, my preferred mode of construction and method of manufacture or fabrication may be further explained, in order to enable those skilled in the art to construct it without excessive difficulty or prolonged and costly experiment.

In order to make this description clearer, the various portions of the sheet metal employed are marked with the reference characters used in Figs. I to IX to designate the portions or features of the hanger body eventually formed from them, plus certain distinctive suffixes indicative of the changes at various stages illustrated.

A flat metal sheet is cut or die punched to an outline appropriate for forming one of the hanger halves H,—the result being the flat blank D shown in Fig. X. The proper outline for the blank D in any particular case can readily be determined, with a few trials, by methods well known to workers with sheet metal. It will be observed that this blank D comprises an intermediate portion $20^d$ between opposite vertical margins $2^d$ that extend vertically either way beyond the central intermediate portion $5^d$.

In order to convert this blank D into one of the hanger halves shown in Figs. I to IX, two principal operations or alterations are now to be wrought upon it: various portions ($2^d$, $23^d$, $20^d$) are to be embossed in correspondence with the intended contours of various parts or features of the hanger, and opposite margins ($2^d$) are to be oppositely retroverted, toward or upon the face of the intermediate portion ($20^d$). The embossing must, I say, include embossing of the margins ($2^d$) in correspondence with the intended contour of the principal strength members or legs 2 of the hanger; and in order to give the leg backs *a, a,* of the hanger forms such as shown in Figs. I to IX, the retroversion must include a more or less sharp lateral turning up of the margins. Also, the edges ($23^d$) of the margins must be turned "down" (so to speak) more or less sharply to form the belly flanges 23 of the hanger.

While the main operations of embossing and turning the margins ($2^d$) can be combined, divided, and performed in various ways and in various relations to one another, I generally prefer to accomplish them by a progressive bending inward of the margins, starting at their outer portions. I also prefer to emboss the margins ($2^d$) and to turn them up in separate operations, and to divide the embossing into two stages and interpose the turning up between them. In this way, I can convert the blank D into a hanger piece H very conveniently and advantageously, as follows:

I first emboss the blank D in any suitable manner (as by die pressing in one or more sets of dies) substantially as shown in Figs. XI to XIII,—the result being the embossed blank E. While this blank still retains the character of a thin sheet, its intermediate portions $5^e$ and $20^e$ and its edges $23^e$ have been embossed upward and downward, respectively, as indicated, in correspondence with their intended contours in the hanger; also, the edges $23^e$ have been sharply turned down at *ke* along the lines *kd* of Fig. X, and the portions $40^e$ embossed upward slightly. The outer portions *ce* of the margins $2^e$ have also been embossed, by bending upward and inward, in correspondence with the intended contours of the legs in these regions,—which correspond in a general way to their bellies *c* in Figs. I to IX. Ordinarily, it is simplest and easiest to do no more than here shown in this first stage or step of the operations.

As the next step, I proceed to turn or bend up the margins $2^e$ of Figs. XI to XIII rather sharply toward the intermediate portion $20^e$ along the line *ld* of Figs. X to XIII,—with the result of producing the embossed and turned up blank F shown in Figs. XIV to XVI. Here difference from Figs. XI to XIII is at once distinguishable in the substantially right angle bend at *lf*. The portion of the margin $2^e$ between the region of previous embossing *ce* and the region of present turning or bending *lf* still remains substantially flat and undeformed (save at 40ᵉ) as in Figs. X and XI to XIII. The bend at $lf$ corresponds, it will be seen, to the overall width of the hanger piece H and of the entire hanger body piece from point to point lengthwise or vertically of the hanger.

The next operation or step in producing the piece H of Figs. I to IX is to bend the margins 2ᵉ of the blank F on inward toward and upon the intermediate portion 20ᵉ of the blank. Before doing this, however, I generally prefer to superpose a couple of the blanks F flat to flat as shown in Fig. XVI, with their intermediate portions 20ᵉ, 20ᵉ overlapping, and their retroverted portions 2ᵉ, 2ᵉ at opposite faces of these portions, and to secure them together in that relation,—thus producing the double turned up and embossed blank G. For this purpose, the intermediate portions 20ᵉ may be spot welded over all or part of their area of contact; or the blanks F, F may be welded along their outer corners $lf$, $lf$,—or both. In the final bending operation, the margins 2ᵉ are bent between the regions $cc$ and $lf$, in the hitherto flat portions $a$ $b$ $e$ that correspond, roughly, to the sides and bellies $a$ and $b$ of the hanger legs 2. Some flexure may also occur, however, in other portions of the margins 2ᵉ,—notably in the bends or corners $lf$ themselves, with the result of making them somewhat sharper than right angles, as shown in Fig. III at $l$.

After the final bending, a couple of the halves H, H are superposed and secured together as by welding or riveting,—provided, of course, this has not already been done,—and the now fully retroverted margins are attached to opposite faces of the intermediate portions 20ᵉ of the blanks, which now form the laminated web plate 20. This last may be done by riveting at 22 through the web 20 and the two belly flanges 23, 23 at opposite sides thereof, as shown in Figs. I, III, V, and VI; or the attachment of the belly flanges 23 may be supplemented or made stronger by spot welding or the like, which may even extend over their entire area of facial contact with the web 20. The hanger body piece 1 of Figs. I to IX is now structurally complete, ready for the attachment of the feet 4 and the bottom yoke 6, etc., with any incidental punching, drilling, etc.

Returning from the preferred mode of construction and manufacture just described to the hanger structure 1 as illustrated, it will now be evident that with reference to either of the legs 2, the flanges or webs 21 and the web 5 may be regarded under an entirely different aspect: i. e., as comprising portions of the sheet metal forming the leg wall oppositely bent into its interior at its back side $a$ and extending in superposition out through its belly side $c$,—for the purpose of supporting the shaft bearing and connecting the leg in question to another leg, as well as for reinforcing and stiffening the first-mentioned leg. In this aspect, the adaptation of the invention to hangers of single leg type will be self-evident.

Though the construction and method of manufacture above described fulfill the purposes of my invention to better advantage than any others known to me, they admit of various alterations, omissions or substitutions, and other variations that will still realize my invention and some of its advantages in its broader aspects. Without attempting even to suggest all possible variations of this sort, I have given information in that direction that should prove useful to those skilled in the art by pointing out, hereinbefore, some of the important functions and advantages of certain features of the construction already described. I will now supplement this information with a brief description of another hanger construction advantageously embodying many features of the construction already described in somewhat different forms, as illustrated in Figs. XVII to XXIV.

In the two sets of figures (I to IX and XVII to XXIV), corresponding parts and features are marked with the same reference characters, plus a distinctive suffix "ˣ" as already noted. Since the minor differences of form, proportions, dimensions, etc., will be readily perceived and understood by those skilled in the art, no general description of the hanger 60ˣ of Figs. XVII to XXIV will be necessary.

Referring, first, especially to Figs. XVII, XVIII, XIX, and XX, a principal difference between the hanger 60ˣ and the hanger 1 will be noted in that each leg 2ˣ of the hanger 60ˣ is formed of a single piece of sheet metal bent to shape, and is therefore integral throughout. The two-ply web plate 20ˣ is initially separate from the legs 2ˣ, and its web portions 21ˣ are each secured and connected or attached to the leg backs $ax$ only at two points: one, 61ˣ, besides the shaft opening 3ˣ, just below the lateral bearing-support 9ˣ; and the other, 62ˣ, above said opening 3ˣ, about on a level with the upper edge of the brace web 5ˣ at its narrowest. These attachments 61ˣ and 62ˣ are formed by heading over rivet protuberances on the edges of the web plies 30ˣ that project through elongated openings or slots in the leg backs $ax$, so as to rivet them into the leg backs.

As to the cross-brace 5ˣ, it will be observed (Figs. XVII, XIX, and XX) that there are four rivets 22ˣ through each pair of opposed belly-flanges 23ˣ and the intervening web plate 20ˣ. It will also be seen (Figs. XVII, XIX, and XXIII) that the adjusting nut 10ˣ is not concealed between separate plies of the web 5ˣ, but is simply channeled so as to seat and be held against turning on the edges 63ˣ of the web slot 36ˣ for the upper bearing-support 7ˣ. As to the bottom member or yoke 6ˣ, it will be seen (Figs. XVII, XVIII, XIX, and XXIV) that it is of rounded cross-section, and that the downward extensions 21ˣ of the plate 20ˣ terminate above its securing-bolts 43ˣ; also that the adjusting nut 11ˣ has a reduced or narrowed rectangular lower portion 64ˣ that seats in a correspondingly narrow opening 45ˣ in the top wall of the yoke 6ˣ, so that there is no need for the trough piece 46 of the hanger 1.

Having thus described my invention, I claim:

1. A sheet metal hanger comprising a hollow leg, with back, sides, and belly, reinforced and stiffened, sidewise of the hanger, by an internal longitudinal web extending from above the shaft opening of the hanger downward as far as the lateral bearing-support of said leg.

2. A sheet metal hanger comprising a hollow leg, with back, sides, and belly, reinforced and stiffened, sidewise of the hanger, by an internal longitudinal web extending from above the shaft opening of the hanger downward as far as the lateral bearing-support of said leg, and from back to belly of the leg.

3. A sheet metal hanger comprising a hollow leg with a transverse member extending laterally therefrom for sustaining a bearing support, and a strength member extending from above the shaft opening of the hanger down in the leg below said transverse member sufficiently to reinforce and stiffen the leg below said member, as well as at its junction therewith.

4. A sheet metal hanger comprising a hollow leg with a transverse member extending laterally therefrom for sustaining a bearing support, and a strength member attached to said transverse member extending down below said transverse member sufficiently to reinforce and stiffen the leg below said transverse member, as well as to brace it relatively thereto.

5. A sheet metal hanger comprising a hollow leg, with back, sides, and belly, and a strength member attached to the leg belly above the shaft opening of the hanger extending down beside the shaft opening sufficiently to resist the side thrust of the lateral bearing support of said leg independently of the intermediate strength of the latter.

6. A sheet metal hanger comprising a hollow leg with a transverse member extending laterally therefrom for sustaining a bearing support, and a strength member attached to said transverse member extending down below said transverse member sufficiently to resist the side thrust of the lateral bearing support of said leg independently of the intermediate strength of the latter.

7. A sheet metal hanger comprising a hollow leg with a transverse member extending laterally therefrom for sustaining a bearing support, and a strength member attached to said transverse member and extending downward within the leg to reinforce and stiffen it and afford a seat for sustaining its lateral bearing support.

8. A sheet metal hanger comprising a hollow leg with a transverse member extending laterally therefrom for sustaining a bearing support, and a strength member attached to said transverse member and extending down past the shaft opening of the hanger to sustain its bottom member.

9. A sheet metal hanger comprising a hollow leg, with back, sides, and belly, reinforced and stiffened, sidewise of the hanger, by a central internal longitudinal web extending from back to belly of said leg at and above its lateral bearing-support.

10. A sheet metal hanger comprising a hollow leg, with back, sides, and belly, reinforced and stiffened, sidewise of the hanger, by a central internal longitudinal web attached to the back of said leg at and above its lateral bearing-support.

11. A sheet metal hanger comprising a hollow leg, with back, sides, and belly, reinforced and stiffened, sidewise of the hanger, by an internal longitudinal web extending from back to belly of said leg at and above its lateral bearing-support, and attached to both back and belly of said leg.

12. A sheet metal hanger comprising a hollow leg, with back, sides, and belly, reinforced and stiffened, sidewise of the hanger, by an internal longitudinal web attached to the back of said leg at and above its lateral bearing-support, and also attached outside the leg to an outward extension of the sheet metal forming the belly wall.

13. A sheet metal hanger comprising a hollow leg, with back, sides, and belly, reinforced and stiffened, sidewise of the hanger, by a central, internal longitudinal web extending past the transverse bearing-support of said leg, the sheet metal of said web being joggled to accommodate said support.

14. A sheet metal hanger comprising a hollow leg, with back, sides, and belly, reinforced and stiffened, sidewise of the hanger, by a central, internal longitudinal multi-ply web extending past the transverse bearing-support of said leg, the plies of said web being locally separated to accommodate said support between them.

15. A sheet metal hanger comprising a hollow leg, with back, sides, and belly, reinforced and stiffened, sidewise of the hanger, by a central, internal longitudinal web extending past the transverse bearing-support of said leg, the sheet metal of said web being laterally displaced to accommodate said support, and the leg wall having an opening to admit and seat a nut for said support against said web.

16. A sheet metal hanger comprising a hollow leg, with back, sides, and belly, reinforced and stiffened, sidewise of the hanger, by a central, internal longitudinal web extending past the transverse bearing-support of said leg, the sheet metal of said web being laterally displaced to accommodate said support, and the leg wall being everted to either side to admit and seat a nut for said support against said web between the everted portions.

17. A sheet metal hanger comprising hollow side legs with an interconnecting cross member, and internal longitudinal webs in the legs attached to said member and to the leg backs, and extending down below said member sufficiently to reinforce and stiffen the legs below said member, as well as to brace them relatively thereto.

18. A sheet metal hanger comprising hollow side legs, with backs, sides, and bellies, reinforced and stiffened, sidewise of the hanger, by central internal longitudinal webs extending from above the shaft opening of the hanger downward below its lateral bearing-support.

19. A sheet metal hanger comprising hollow legs, with backs, sides, and bellies, reinforced and stiffened, above and at the sides of the shaft opening of the hanger, by a common web plate extending through the bellies of the legs above the shaft opening of the hanger and having extensions downward into said legs.

20. A sheet metal hanger comprising hollow legs, with backs, sides, and bellies, reinforced and stiffened, in their common plane, by a common central multi-ply web-plate extending through the bellies of the legs above the shaft opening of the hanger and downward into said legs at the sides of said opening; the plies of said web being locally separated to accommodate between them the upper and lateral bearing-supports of the hanger.

21. A sheet metal hanger comprising hollow legs with a common interconnecting web plate extending and attached to the backs of the legs above the shaft opening of the hanger and sufficiently below the transverse interconnection formed by the web plate to reinforce and stiffen the legs below such connection.

22. A sheet metal hanger comprising hollow legs, with backs, sides, and bellies, reinforced and stiffened, above and at the sides of the shaft opening of the hanger, by a common interconnecting web plate extending and attached to the backs of the legs above the shaft opening of the hanger and sufficiently below the transverse interconnection formed by the web plate to reinforce and stiffen the legs below such connection, and also attached to the bellies of the legs.

23. A sheet metal hanger comprising hollow legs, with backs, sides, and bellies; and a common web plate extending through the bellies of the legs above the shaft opening of the hanger, and having extensions downward into the legs for resisting the side thrust of the lateral bearing-supports of the hanger.

24. A sheet metal hanger comprising hollow legs, with backs, sides, and bellies; and a common web plate extending through the bellies of the legs above the shaft opening of the hanger, and having extensions downward into the legs attached to the backs thereof at either side of said opening.

25. A sheet metal hanger comprising round, hollow legs, closed from the hanger feet to its lateral bearing-supports, and a common central interconnecting web plate extending through the bellies of the legs above the shaft opening of the hanger, and having extensions downward into the legs for resisting the side thrust of said lateral bearing-supports.

26. A sheet metal hanger comprising round, hollow legs, closed from the hanger feet to its lateral bearing-supports; and a common interconnecting web plate extending to the backs of the legs above the shaft opening, and thence downward along said backs as far as said bearing-supports.

27. A hanger comprising a structurally complete, rigid, closed frame for sustaining vertical and opposed lateral bearing supports, with hollow legs for supporting said frame enclosing the frame members that sustain said lateral bearing supports.

28. A hanger comprising a structurally complete rigid frame for sustaining bearing supports, with means for supporting said frame comprising a hollow leg enclosing one of its bearing support sustaining members.

29. A hanger comprising a structurally complete rigid frame for sustaining bearing supports, with hollow legs for supporting said frame enclosing and secured to its upper corners.

30. A hanger comprising a structurally complete rigid, closed frame for sustaining vertical and opposed lateral bearing supports, with legs for supporting said frame externally overlapping the frame members that sustain said lateral bearing supports and secured to the upper and lower corners of the frame.

31. A hanger comprising a structurally complete rigid U frame for sustaining bearing supports, with hollow legs for supporting said frame enclosing the sides of the U.

32. A hanger comprising a structurally complete rigid U frame for sustaining bearing supports, with legs for supporting said frame secured to its corners and overlapping its sides; and a bottom yoke for bridging the opening of the U, with means for detachably securing it both to the sides of the U and to the legs.

33. A hanger comprising a rigid integral multiply sheet metal U frame with its plies separated to accommodate bearing supports between them, with means for supporting said frame comprising hollow legs enclosing and attached to the sides of the U.

34. A hanger comprising a structurally complete rigid frame for sustaining bearing supports, with means for supporting said frame comprising embossed sheet metal leg halves at either side thereof forming hollow legs enclosing its lateral members.

35. A sheet metal hanger comprising superposed sheets with their respective opposite vertical margins oppositely retroverted to afford strength.

36. A sheet metal hanger piece comprising a sheet with its vertical margins retroverted to form principal vertical strength elements of the hanger.

37. A sheet metal hanger piece comprising a web with vertical margins extending vertically beyond an intermediate portion and retroverted to form principal strength elements of the hanger.

38. A sheet metal hanger piece comprising a web with retroverted margins extending at either side of the hanger shaft opening as strength elements of the hanger.

39. A sheet metal hanger comprising overlapping sheets with opposite vertical margins retroverted to form principal vertical strength elements of the hanger.

40. A sheet metal hanger comprising a web composed of plies with their respective opposite vertical margins extending vertically beyond intermediate portions and oppositely retroverted to form principal strength elements of the hanger.

41. A sheet metal hanger comprising a multi-ply web interconnecting hollow side legs formed by oppositely retroverted margins of the plies.

42. A sheet metal hanger comprising superposed sheets with respective opposite margins oppositely retroverted to form hollow side legs for the hanger, and a shaft opening therein between said margins.

43. A sheet metal hanger comprising a multi-ply web interconnecting hollow side legs formed by opposite margins of the plies retroverted and attached to opposite faces of said web.

44. A sheet metal hanger comprising a multi-ply web interconnecting hollow side legs formed by opposite margins of the plies retroverted and attached to opposite faces of said web, said web being stiffened with embossment extending into said legs.

45. A sheet metal hanger comprising round, hollow legs, closed from the hanger feet to its lateral bearing-supports, reinforced and stiffened, above and at the sides of the shaft opening of the hanger, with a common interconnecting web plate extending through the bellies of the legs above said shaft opening and thence downward at the sides of said opening; said legs and web plate being formed by superposed sheets with opposite margins oppositely retroverted upon opposite faces of the sheets.

46. A sheet metal hanger comprising a hollow leg reinforced and stiffened, sidewise of the hanger, with a central internal longitudinal flange projecting inward from the enclosing wall of the leg and attached to such enclosing wall throughout its own length.

47. A metal hanger comprising a hollow leg reinforced and stiffened, sidewise of the hanger, with an internal longitudinal flange integral with the enclosing back and side walls of the leg, and extending along and projecting inward from such enclosing back wall.

48. A sheet metal hanger comprising a hollow leg reinforced and stiffened, sidewise of the hanger, with an internal longitudinal flange formed by portions of the sheet metal of its enclosing back and side walls oppositely bent into its interior at its back.

49. A sheet metal hanger comprising a hollow leg reinforced and stiffened with an internal longitudinal web formed by a portion of the sheet metal of its wall bent into its interior at one side.

50. A sheet metal hanger comprising a hollow leg reinforced and stiffened with an internal longitudinal web formed by a portion of the sheet metal of its wall bent into its interior at its back and attached to its belly.

51. A sheet metal hanger comprising a hollow leg reinforced and stiffened with an internal longitudinal web formed by a portion of the sheet metal of its wall bent into its interior at one side, and extending out through its other side for attachment to an external longitudinal flange thereon.

52. A sheet metal hanger comprising a hollow structural member with a portion of the sheet metal forming it bent into its interior at one side and extending out through the other side for supporting a bearing.

53. A sheet metal hanger comprising a hollow structural member with portions of the sheet metal forming its wall oppositely bent into its interior at one side and extending in superposition out through its other side for supporting a bearing.

54. A sheet metal hanger comprising a hollow side leg with a portion of the sheet metal forming it bent into its interior at its back and extending out through its belly to connect it to another side leg.

In testimony whereof, I have hereunto signed my name, at Philadelphia, Pennsylvania, this 30th day of August, 1921.

RUSSELL H. BOWEN.

Witnesses:
 JAMES H. BELL,
 ANNA M. PETTERSON.